United States Patent [19]

Roller

[11] Patent Number: 5,037,082
[45] Date of Patent: Aug. 6, 1991

[54] INVERTERLESS DOCUMENT HANDLER
[75] Inventor: George J. Roller, Penfield, N.Y.
[73] Assignee: Xerox Corporation, Stamford, Conn.
[21] Appl. No.: 132,848
[22] Filed: Dec. 14, 1987
[51] Int. Cl.$^5$ ............................................. B65H 29/00
[52] U.S. Cl. ..................................... 271/187; 271/315
[58] Field of Search ................ 271/3.1, 184, 186, 187, 271/188, 209, 291, 315, 65, 306, 307; 355/23, 24, 14 SH

[56] References Cited
U.S. PATENT DOCUMENTS

| | | | |
|---|---|---|---|
| 4,073,585 | 2/1978 | Kobayashi et al. | 355/14 |
| 4,234,180 | 11/1980 | Looney | 271/3.1 |
| 4,252,309 | 12/1981 | Garrison et al. | 271/186 |
| 4,262,895 | 4/1981 | Wenthe, Jr. | 271/65 |
| 4,284,270 | 8/1981 | Silverberg | 271/166 |
| 4,359,217 | 11/1982 | Roller et al. | 271/188 |
| 4,365,794 | 12/1982 | Roller | 271/186 |
| 4,411,517 | 10/1983 | Gerken | 355/14 SH |
| 4,431,177 | 2/1984 | Beery et al. | 271/186 |
| 4,436,301 | 3/1984 | Doery et al. | 271/177 |
| 4,456,236 | 6/1984 | Buddendock | 271/3.1 |
| 4,456,237 | 6/1984 | Buddendeck | 271/3.1 |
| 4,466,607 | 8/1984 | Clark et al. | 271/225 |
| 4,506,881 | 3/1985 | Hunt et al. | 271/65 |
| 4,531,725 | 7/1985 | Seelen | 271/186 |
| 4,548,402 | 10/1985 | Namba | 271/290 |
| 4,579,326 | 7/1986 | Pickney et al. | 271/3.1 |
| 4,667,951 | 5/1987 | Honjo et al. | 271/3.1 |
| 4,671,503 | 6/1987 | Uemoti et al. | 271/65 |
| 4,712,785 | 12/1987 | Stemmle | 271/187 |
| 4,714,241 | 12/1987 | Randall | 271/3.1 |

FOREIGN PATENT DOCUMENTS

| | | | |
|---|---|---|---|
| 0254462 | 11/1986 | Japan | 271/186 |
| 1210564 | 10/1970 | United Kingdom . | |
| 1464132 | 2/1977 | United Kingdom . | |
| 1475094 | 6/1977 | United Kingdom . | |
| 1492316 | 11/1977 | United Kingdom . | |
| 1566135 | 3/1980 | United Kingdom . | |
| 2082550 | 3/1982 | United Kingdom . | |

OTHER PUBLICATIONS

Xerox Disclosure Journal, vol. 12, No. 3, May/Jun. 1987, pp. 137 and 138 Entitled "Sheet Stacking Apparatus".

Primary Examiner—H. Grant Skaggs
Attorney, Agent, or Firm—William A. Henry, II

[57] ABSTRACT

A document handler for recirculating either simplexed or duplexed documents onto a platen of a copier includes a feed and refeed tray positioned adjacent to the platen. A compact and selecively actuable disc stacker is included that is adapted when in one position to receive and invert documents directed toward the feed and refeed tray and when in another position allows the documents to pass thereover without inversion, as well as, corrugation nips that corrugates documents passing therethrough toward the refeed tray.

12 Claims, 5 Drawing Sheets

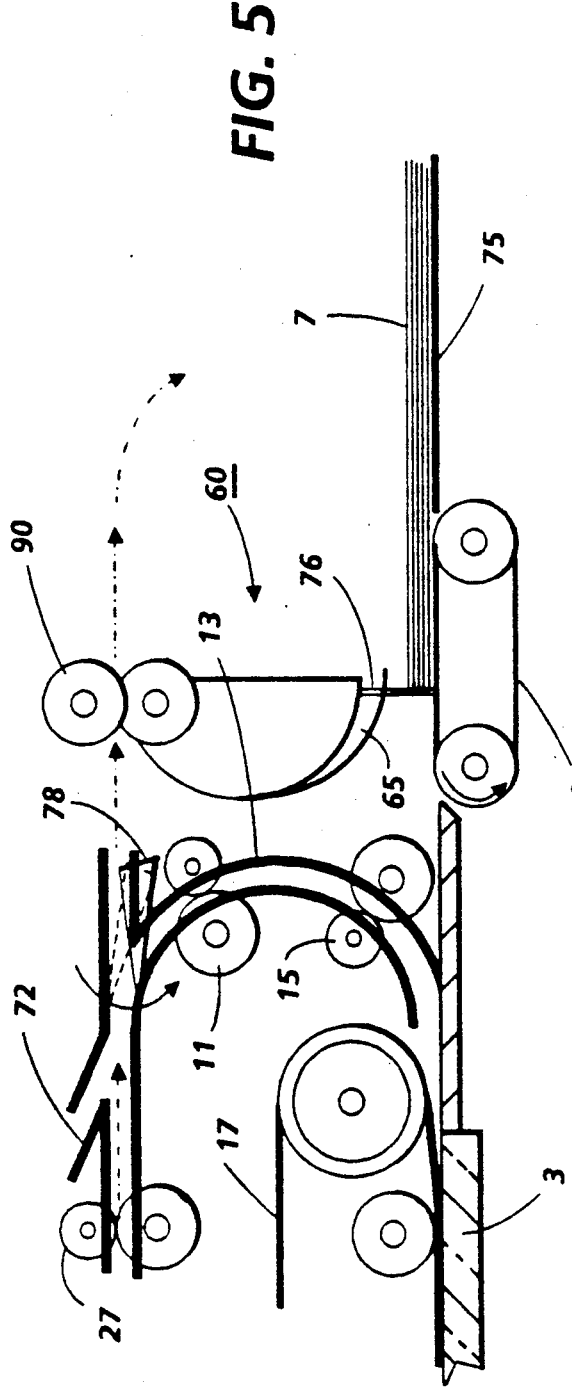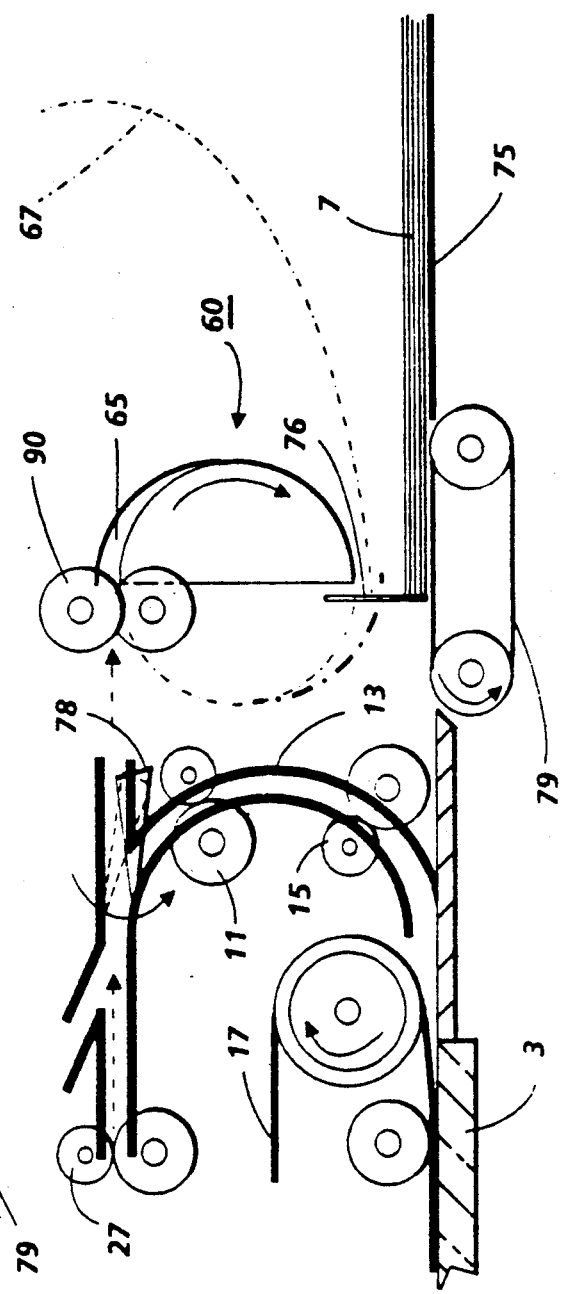

INVERTERLESS DOCUMENT HANDLER

In high speed xerographic copy reproduction machines wherein copies can be produced at a rate in excess of three thousand copies per hour, the need for a document handler to feed documents to the copy platen of the machine in a rapid, dependable matter was recognized to enable full utilization of the reproduction machines potential copy output. A number of document handlers are currently available to fill that need. These document handlers must operate flawlessly to virtually eliminate the risk of damaging the originals and generate minimum machine shutdowns due to uncorrectable misfeeds or document multifeeds. Current full function document handlers, i.e., those that operate in all modes (simplex to simplex and duplex to duplex) require an active inverter to assure proper stacking in all modes. It is in the reliable inversion of the individual documents where a number of problems occur. Also, inverters with their attendant mechanisms used in document handlers add significant cost to the devices. A disc stacker offers more reliable means to invert documents during the restacking process for a subset of these modes at a more modest cost.

For example, in U.S. Pat. No. 4,284,270, which is included herein by reference, a recirculating document handler for separating and feeding the bottom document in a document stack is disclosed that includes a plurality of vacuum feed belts spaced from the bottom surface of the document stack, the document stack being supported on a stack tray having a "U" shaped pocket formed therein. The vacuum from the feed belts causes a portion of the bottom sheet in the stack to be pulled into the pocket for contact with the vacuum feed belts. For duplexing, the documents are passed through an inverter before returning to the stack tray.

Other apparatus that perform selectable face up or face down (inverted or non-inverted) sheet stacking/inverting of original document sheets being recirculated and restacked in a recirculating document handler for a copier include U.S. Pat. Nos. 4,234,180; 4,436,301 and the references cited therein; 4,456,236; and U.K. Patent 1,464,132. U.S. Pat. No. 4,712,785 and Xerox Disclosure Journal publication entitled Sheet-Stacking Apparatus, Vol. 12, Number 3, May/June 1987 disclose the use of a disc stacker in conjunction with corrugation rolls in collating copy sheets in an output tray. However, even with all of these teachings being available, there has continued to be a long felt need for a document inverting device that is usable with a recirculating document handler of the type in U.S. Pat. No. 4,284,270 that is more reliable, less costly and less mechanically complex than present inverters.

Accordingly, in one embodiment of the present invention, a document handler for recirculating either simplexed or duplexed documents onto a platen of a copier is disclosed that includes a feed and refeed tray positioned adjacent to the platen. A compact and selectively actuable disc stacker is included that is adapted when in a first position to receive and invert documents directed toward the feed and refeed tray and when in a second position allows the documents to pass thereover without inversion. Corrugation nips are included to corrugate documents passing therethrough toward the refeed tray for straightening and decurling purposes.

In a second embodiment of the present invention, a document handler for recirculating either simplexed or duplexed documents onto a platen of a copier is disclosed that includes a feed and refeed tray positioned above the platen. A compact and selectively actuable disc stacker is included that is adapted when in a first position to receive and invert documents directed toward the feed and refeed tray and when in a second position allows the documents to pass thereover without inversion.

The above-mentioned features and others of the invention together with the manner of obtaining them will best be understood by making reference to the following specification in conjunction with the accompanying drawings, wherein:

FIGS. 5 and 6 are enlarged, cross-sectional partial schematic views showing the operation of the disc stacker of FIG. 4.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
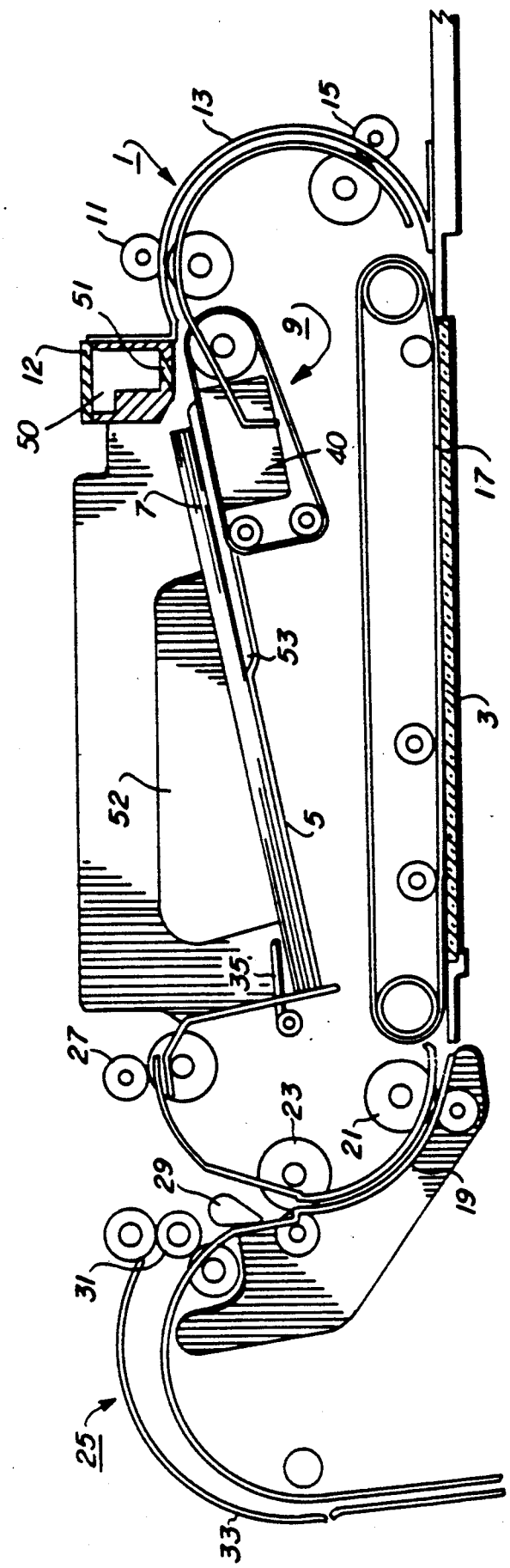
FIG. 1 is an enlarged cross-sectional view of a prior art document handler employing an inverter for duplexing purposes.

For a general understanding of the features of the present invention, reference is had to the drawings. In the drawings, like reference numerals have been used throughout to designate identical elements. FIG. 1 schematically depicts the various components of an illustrative electrophotographic copying machine incorporating the multi-directional jam switch device of the present invention therein.

Referring to the drawings, there is illustrated a prior art automatic document handler 1 for installation above the exposure platen 3 of a xerographic reproduction machine. The document handler is provided with a document tray 5 adapted for supporting a stack of documents 7 face up. A vacuum belt-corrugating feeder mechanism 9 is located below the document tray for acquiring and corrugating the bottom document in the stack and forwarding the document to take away roll pair 11 after an air knife 12 has had time to separate sheet one from the rest of the stack. The document is then fed by take-away roll pair 11 through document guide 13 to feed-roll pair 15 and under platen belt 17 onto the platen of the copy machine for reproduction. After exposure of the document, it is fed off the platen by belt 17 into guide 19 and feed-roll pairs 21 and 23 either to an inverter mechanism 25 or back to the document stack through the feed-roll pair 27. A diverter 29 is provided to divert the document either to the inverter or to the feed-roll pair 27. The invertor comprises a three roll arrangement 31 and a closed inverter pocket 33. If the document is to be inverted it is fed through the lower two rolls of the three roll inverter into the pocket. When the trail edge of the document clears the nip of the lower two rolls in the three roll inverter, the stiffness of the sheet will cause the trail edge to straighten up into the nip of the upper two rolls of the inverter at which time it will be fed into roll pair 27 and back into the document stack. The inverter pocket illustrated is sized such that when the leading edge of the document contacts the end of the pocket, the document will buckle slightly within the upper portion of the pocket 33, the buckle thereby providing the required force to feed the trailing edge of the document into the upper roll pair of the inverter rolls for feeding the sheet toward roll pair 27. If desired, an open ended inverter pocket could be utilized having a feed roll pair associated therewith for feeding the document back into the upper roll pair in a positive manner rather than relying on the sheet buckle to feed the document thereto.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors are provided to sense that the last document in the set has been removed from the tray and the finger is then rotated in a clockwise direction to again come to rest on the top of the documents in the stack prior to subsequent recirculation of the document set.

With continued reference to FIG. 1, document tray 5 is provided with a depressed portion of pocket 53 having a generally parabolic outline behind a feed belt assembly while a plurality of feed belts 37 are supported for movement around vacuum plenum 41. Vacuum plenum 41 is spaced within the runs of the belts 37 and has openings therein adapted for cooperation with perforations in the belts 37 to provide a vacuum for pulling the botton documents in the document stack onto the belts 37. The plenum is provided with a raised portion beneath the center belt run so that upon capture of the bottom document in the stack against belts 37, a center corrugation will be produced in the bottom sheet. Thus, the document is corrugated into a double valley configuration. The flat surfaces of the vacuum belts on each side of the raised center belt generates a region of maximum stress in the document which varies with the document beam strength. In the unlikely event that more than one document is pulled down into contact with the feed belt, the beam strength of the second document resists the corrugating action, thus gaps are opended between sheets one and two which extend to their lead edges. These gaps and channels reduce the vacuum levels between sheets one and two due to porosity in sheet one and provide for entry of the separating air flow from the air knife 12. The air knife 12 comprised of pressurized air plenum 50 having a plurality of air jet openings 51 is provided to inject air between the document pulled down against the feed belt and the documents thereabove to provide an air cushion or bearing between the stack and the bottom document to minimize the force necessary for removing the bottom document from the stack. It can be understood that if two documents are pulled down toward the belts 37, since the top sheet would not be corrugated, the air knife would inject air into the space between the two documents and force the second document off from the raised belt back toward the document stack. Control of the height to which the stack is raised by the air pressure under sheet two is provided by openings such as cutaway 52 in the side wall and openings in the rear wall (not shown). These openings vent the air under sheet two when the stack is lifted to the height of the openings.

Figure 2:
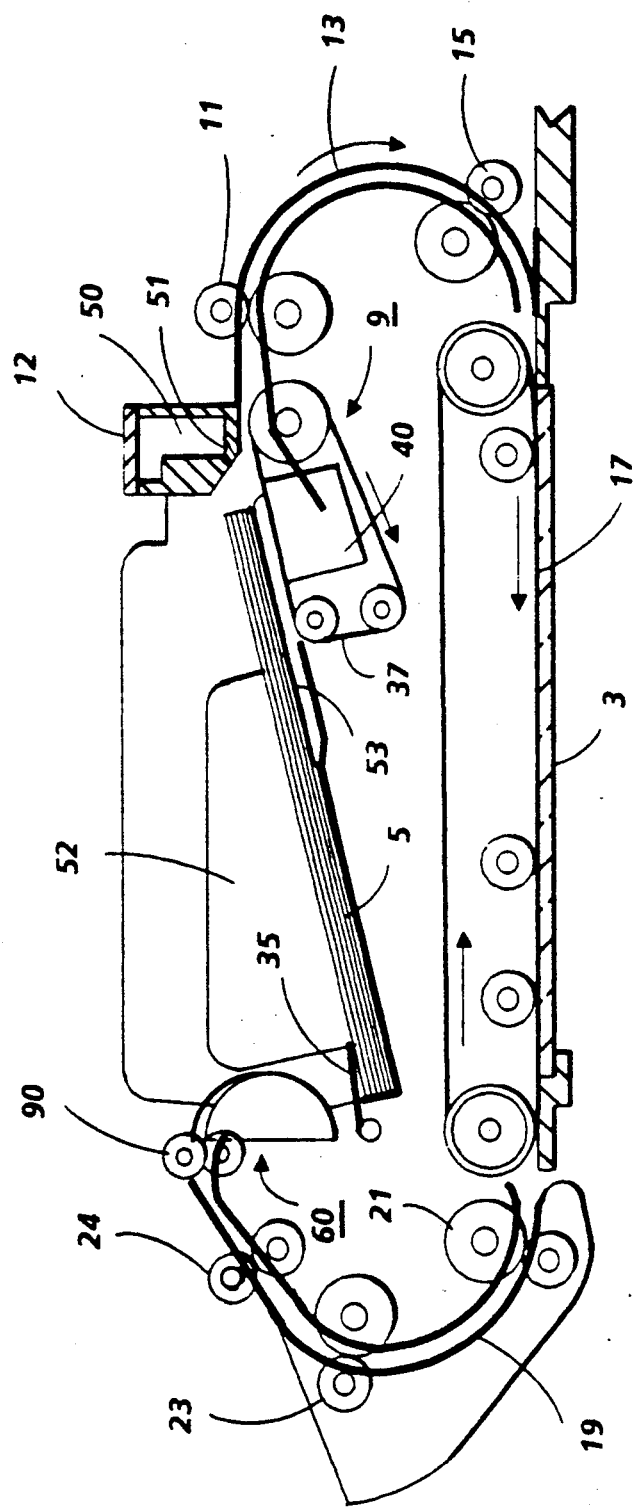
FIG. 2 is an enlarged, cross-sectional view of the document handler of FIG. 1 employing the disc stacker of the present invention.

Turning now to the present invention, the document handler of FIG. 2 is the same as that in FIG. 1 except that the inverter of FIG. 1 has been replaced with a disc stacker 60 which is more reliable, less costly and less mechanically cumbersome. The disc 60 is conventionally mounted on a drive shaft (not shown). The disc has an arcurate slot 65 on its periphery which is open at one end of the disc and which—in the solid line position of FIG. 2—is roughly in line to receive documents from the exit portion of the guide 19. In this position, when flipping or inverting of the document is required for proper collation, slot 65 communicates with guide 19 for receiving a document that has been forwarded by transport belt 17 and feed roll pairs 21, 23, 24. If flipping of the document is not required, disc 60 is in its dotted line position shown in FIG. 3 and the document it is fed past an arcuate surface of disc 60 and into tray 5. Corrugation rolls 90 are adapted to corrugate the documents en route to tray 5 for straightening or decurling purposes.

Figure 3:
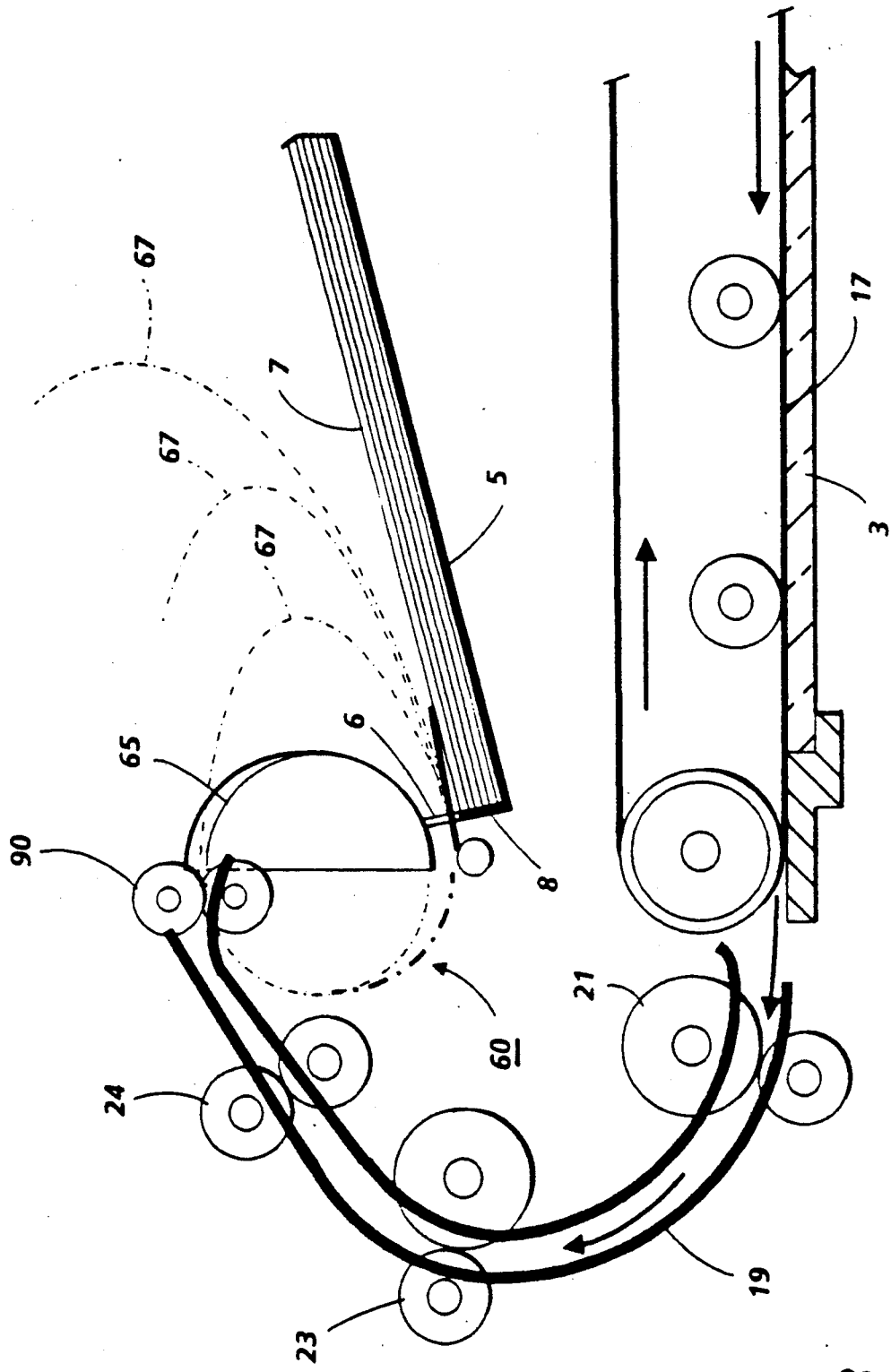
FIG. 3 is an enlarged, partial cross-sectional schematic view of the disc stacker of FIG. 2.

With reference to FIG. 3, the disc 60 is adapted to make a complete revolution by passing through opening 6 in the back wall 8 of tray 5. When inversion of a document is required, the document's lead edge is driven into and captured by slot 65 in disc 60 which is activated by a conventional microprocessor in the copier/printer. Rotation of the disc will cause the document to be propelled in an arc shown by dotted lines 67. Initially the arc is small, however, continued rotation of the disc brings the document into contact with back wall 8 of tray 5 where it is separated from disc 60 since disc 60 passes through opening 6 in the tray. Thus, the document is turned over or inverted since the lead edge of the document is now at the rear of the tray and the previously exposed side of the document is now face down instead of face up as when the document was initially fed from tray 5 toward exposure platen 3. It should be understood that disc 60 could be one member that extends widthwise of tray 5 or comprise a plurality of disc members. When inversion is not necessary for proper collation of documents, disc 60 is in its dotted line position and documents transported away from platen 3 through guide 19 pass over disc 60 and into tray 5.

Figure 4:
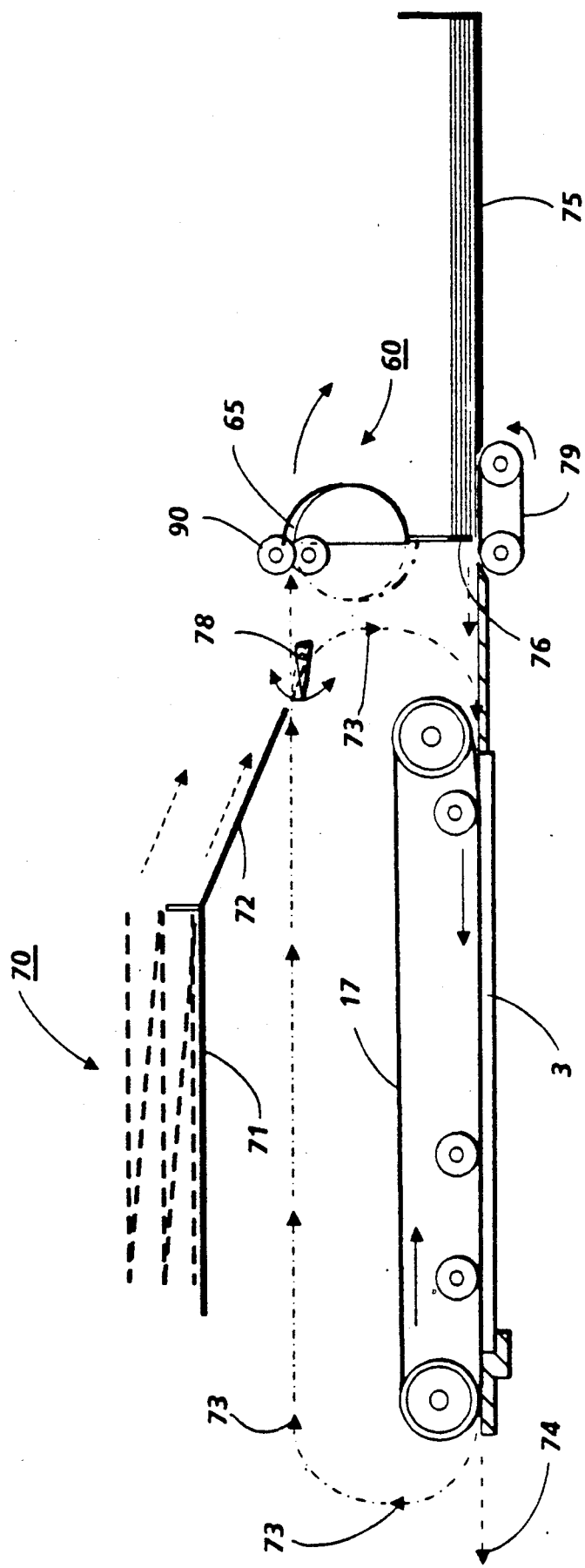
FIG. 4 is an enlarged, cross-sectional schematic view of an alternative document handler employing the disc stacker of the present invention.

An alternative embodiment of the present invention is shown in FIGS. 4–6 where a feed and refeed document handler 70 includes interleaving a "half moon" disc stacker(s) 60 with a set of corrugating rolls that form nip(s) 90 to enable proper document restacking during all modes of document handling. The combination provides a highly reliable, cost effective full function stacker. Document handler 70 is adapted to feed fan folded documents from tray 71 as well as individual documents from tray 72 into an enclosed loop indicated by arrowheads 73, both of which are fed away from platen 3 by transport 17 in the direction of arrowhead and 74 toward a catch tray (not shown). Documents are also fed from tray 75 onto platen 3 by feedbelt 79. After imaging at platen 3, each document is driven within the enclosed loop defined by arrowhead 73 toward decision gate 78. If no recirculation of the document is required and inversion is required, decision gate 78 is left in the position shown in FIG. 4 and the documents are transported through conventional corrugation nip rollers 90 and into cut-out portion 65 of disc 60 which is in the solid line position and then rotated by the disc into tray 75. Rotation of the disc inverts each document and back wall 76 of tray 75 strips the documents away from the disc where they settle due to gravity onto the bottom support surface of tray 75. However, if inversion is not required, disc 60 is activated conventionally by the machines' controller into the dotted line position and each document is driven over disc 60 by corrugation rolls 90 into tray 75.

As can be seen more clearly from FIGS. 5 and 6, documents can be recirculated onto platen 3 as many times as desired by activating decision gate 78 into the shown dotted line position. Disc 60 is positioned vertically with its flat side in line with wall 76 as a home position in order to insure that large stack heights of documents can be accommodated in tray 75.

It should now be apparent that a disc stacker is disclosed as being utilized for documents requiring inversion prior to refeed in a document handling environment. During this time, a set of corrugating nips that are interleaved with the disc stacker. The disc stacker then rotationally inverts documents going into the refeed tray of the document handler. For documents requiring no inversions, the disc stacker is in an out of the way position that allows documents to pass thereover for corrugating prior to entry back into the refeed tray of the document handler.

While I have described a preferred embodiment of my invention, it should be understood that the invention may be otherwise embodied within the scope of the following claims.

I claim:

1. In a document handler for recirculating either simplexed or duplexed documents onto and away from a platen for exposure onto a photoconductor of a copier, that includes a feed and refeed tray positioned adjacent the platen, the improvement comprising:
    a compact, notched and selectively actuable, semicircular document disc stacker means, said disc stacker means being positioned and adapted when in a first position to receive and invert documents directed toward the feed and refeed tray and when in a second position allows the documents to pass thereover without inversion into the feed and refeed tray; and
    corrugation nip means adapted to corrugate documents passing therethrough toward the feed and refeed tray, said corrugation nip means being positioned in closely spaced relation to said disc stacker means and adapted such that documents are driven into or over said disc stacker means depending on the position of said disc stacker means.

2. The document handler of claim 1, including selectively actuable diverter means for directing documents away from or towards the feed and refeed tray.

3. A document handler for recirculating either simplexed or duplexed documents onto a platen for exposure onto a photoconductor of a copier includes a feed and refeed tray positioned above the platen, and is characterized by: a compact, notched and selectively actuable document disc stacker means positioned at the entrance of said feed and refeed tray that is adapted when in a first position to receive and invert documents directed toward the feed and refeed tray and when in a second position allows the documents to pass thereover without inversion.

4. The document handler of claim 3, including corrugation nip means adapted to corrugate documents before they reenter the feed and refeed tray and to provide drive means for driving a document into a slot portion of said disc stacker when said disc stacker is in said first position.

5. The document handler of claim 3, wherein said disc stacker means has a periphery portion that is positioned below said corrugation nip means when said disc stacker means is in said second position.

6. A document handler for recirculating either simplexed or duplexed documents onto and away form a platen for exposure onto a photoconductor of a copier includes a feed and refeed tray positioned adjacent the platen, and is characterized by: a compact and selectively actuable document disc stacker means positioned at the entrance of said feed and refeed tray that is adapted when in a first position to receive and invert documents directed toward the feed and refeed tray and when in a second position allows the documents to pass thereover without inversion.

7. The document handler of claim 6, including corrugation nip means adapted to corrugate documents before they reenter the feed and refeed tray and to provide drive means for driving a document into a slot portion of said disc stacker when said disc stacker is in said first position.

8. The document handler of claim 7, wherein said disc stacker means has a periphery portion that is positioned below said corrugation nip means when said disc stacker is in said second position.

9. The document handler of claim 8, including selectively actuable diverter means for directing documents away from or towards the feed and refeed tray.

10. In a document handler for recirculating either simplexed or duplexed documents onto and away from a platen for exposure onto a photoconductor of a copier, that includes a feed and refeed tray positioned above the platen, the improvement comprising:
    a compact, slotted and selectively actuable semi-circular document disc stacker means, said disc stacker means being positioned and adapted when in a first position to receive and invert documents directed toward the feed and refeed tray and when in a second position allows the documents to pass thereover without inversion into the feed and refeed tray; and
    corrugation nip means adapted to corrugate documents passing therethrough toward the feed and refeed tray, said corrugation nip being positioned in closely spaced relation to said disc stacker means and adapted such that documents are driven into or over said disc stacker means depending on the position of said disc stacker means.

11. In a document handler for recirculating either simplexed or duplexed documents onto and away from a platen for exposure onto a photoconductor of a copier, that includes a feed and refeed tray positioned adjacent the platen, the improvement comprising:
    a compact, notched and selectively actuable semi-circular document disc stacker, said disc stacker being positioned and adapted when in a first position to receive and invert documents directed toward the feed and refeed tray and when in a second position allows the documents to pass thereover without inversion into the feed and refeed tray, said disc stacker having a slot portion in its periphery that is adapted to intercept documents when said disc stacker is in said first position and a periphery portion that allow documents to pass thereover when said disc stacker is in said second position.

12. In a document handler for recirculating either simplexed or duplexed documents onto and away from a platen for exposure onto a photoconductor of a copier, that includes a feed and refeed tray positioned above the platen, the improvement comprising:

a compact and selectively actuable semi-circular document disc stacker, said disc stacker being positioned and adapted when in a first position to receive and invert documents directed toward the feed and refeed tray and when in a second position allows the documents to pass thereover without inversion into the feed and refeed tray, said disc stacker having a slot portion in its periphery that is adapted to intercept documents when said stacker is in said first position and a periphery portion that allow documents to pass thereover when said disc stacker is in said second position.

* * * * *